United States Patent [19]

Bowen

[11] 4,042,509
[45] Aug. 16, 1977

[54] WATER TREATMENT SYSTEM

[75] Inventor: James H. Bowen, Adger, Ala.

[73] Assignee: BDH, Inc.(Entire), Rome, Ga.

[21] Appl. No.: 665,870

[22] Filed: Mar. 11, 1976

[63] Substitute application for Ser. No. 539,908, Jan. 9, 1975, abandoned.

[51] Int. Cl.$^2$ .................... B01D 33/02; B01D 35/22; C02B 1/80; C02C 5/04
[52] U.S. Cl. .................................. 210/192; 210/205; 210/DIG. 22; 204/152; 204/277
[58] Field of Search .................... 210/64, 192, 62, 63, 210/391, 205, DIG. 22; 204/152, 277

[56] References Cited

U.S. PATENT DOCUMENTS

| | | | |
|---|---|---|---|
| 2,678,733 | 5/1954 | Reeves | 210/391 X |
| 3,336,099 | 8/1967 | Czulak et al. | 210/63Z X |
| 3,455,821 | 7/1969 | Aremaa | 210/192 X |
| 3,549,528 | 12/1970 | Armstrong | 210/64 X |
| 3,630,377 | 12/1971 | Brooks | 210/152 |
| 3,681,236 | 8/1972 | Bergles et al. | 210/62 X |
| 3,925,176 | 12/1975 | Okert | 204/149 X |

Primary Examiner—John H. Mack
Assistant Examiner—D. B. Valentine
Attorney, Agent, or Firm—Clarence A. O'Brien; Harvey B. Jacobson

[57] ABSTRACT

A water treatment system having a self-cleaning filter assembly connected to a supply conduit for receiving an effluent and filtering solids from the effluent. The filtered effluent is passed through an ozone and oxidation assembly and into an ozonizing stage which includes subjecting the effluent to ultra-sonic waves and an electric current simultaneously for changing the condition and character of the effluent. The system includes a sterilizing assembly for decontaminating the ozonized effluent, with a chlorinator desirably chlorinating the effluent prior to discharge of the effluent from the system.

13 Claims, 9 Drawing Figures

Fig. 1

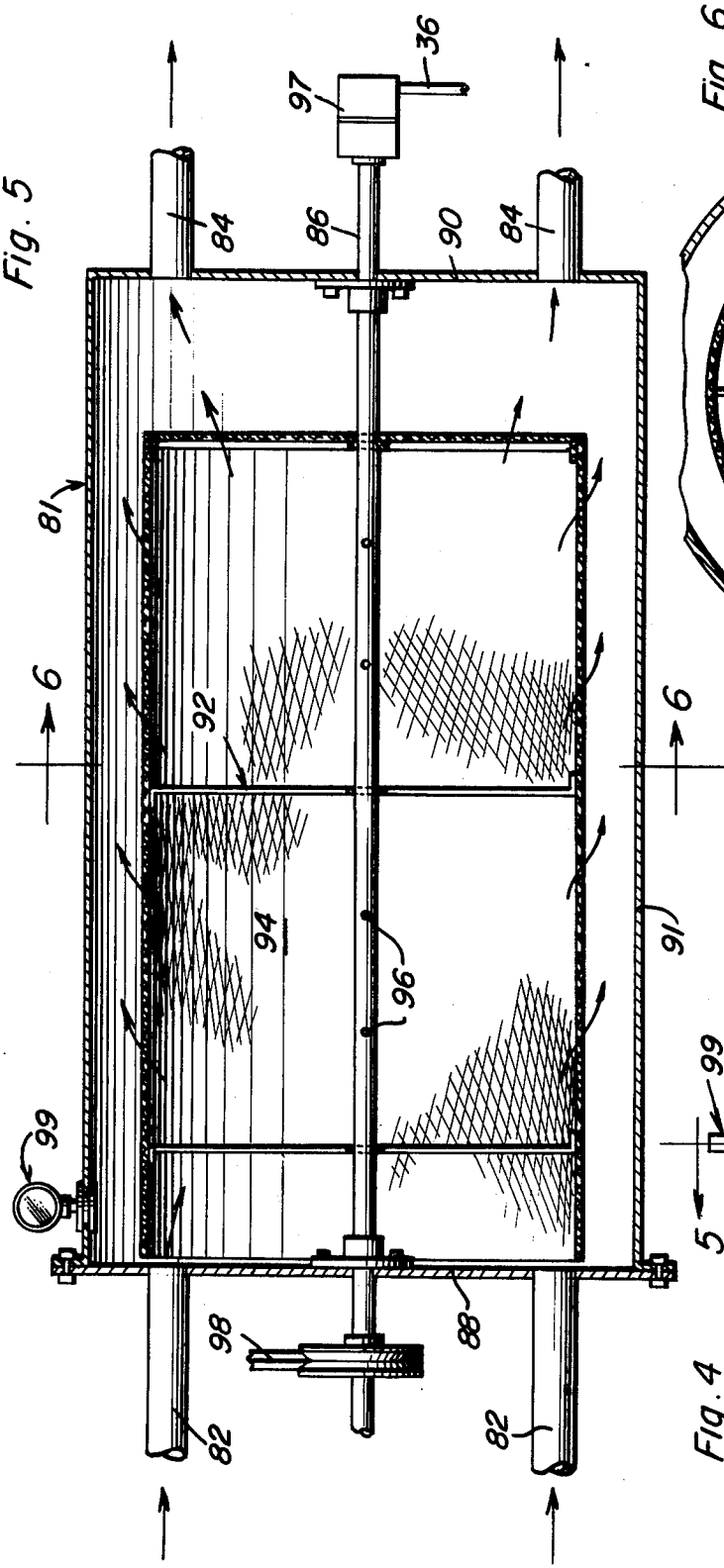
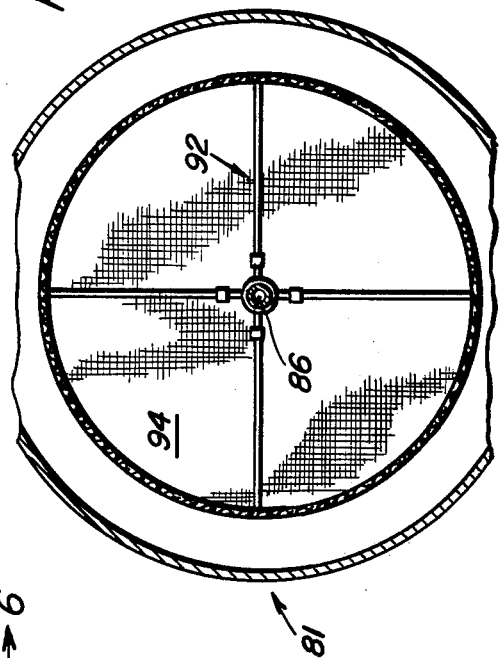
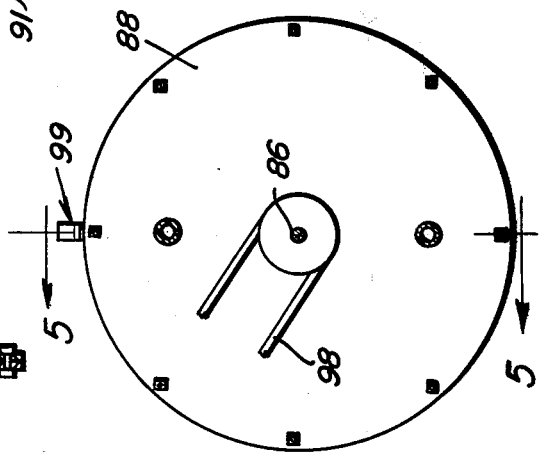

WATER TREATMENT SYSTEM

This is a substitute for application Ser. No. 539,908, filed Jan. 9, 1975 and now abandoned.

BACKGROUND OF THE INVENTION

1. Field of the Invention

This invention relates generally to treatment of effluents, and particularly to a treatment system for polluted water, sewage, and the like.

2. Description of the Prior Art

Of tremendous interest today is the treatment of sewage, polluted and brackish water, and the like, to make such unpotable liquids potable. Typical examples of treatment systems proposed for this purpose are shown in U.S. Pat. Nos. 3,549,528, issued Dec. 22, 1970 to E. T. Armstrong, and 3,664,951, issued May 23, 1972 to L. B. Armstrong. These known systems generally ozonize the effluent for purifying same. U.S. Pat. Nos. 3,296,122, issued Jan. 3, 1967 to I. J. Karassik et al., uses a pasteurizing stage followed by a sterilizing stage to obtain fresh unpolluted water from sewage effluent.

Electrical stimulation is a known manner of treating sewage. The use of alternating electricity activates microorganisms in the effluent and facilitates the decomposition reaction in the effluent. See U.S. Pat. No. 3,336,220, issued Aug. 15, 1967 to G. Neidl, for a discussion of the use of such electrical stimulation to enhance biodegradation of sewage and other biologically decomposible organic matter. Further, it has been proposed to enhance ozonization by subjecting an efflent to sonic energy, as discussed in U.S. Pat. No. 2,562,545, issued July 31, 1951 to R. M. Gogolick et al., while U.S. Pat. No. 3,458,140, issued July 29, 1969 to G. W. Schryver, discloses the use of radiation to sterilize an agitated effluent.

Other prior U.S. Pat Nos. considered pertinent to the present invention are as follows:

| | | |
|---|---|---|
| 3,186,939 | P. J. Murray | June 1, 1965 |
| 3,227,642 | J. H. Lemelson | Jan. 4, 1966 |
| 3,591,009 | O. Luthi | July 6, 1971 |
| 3,766,059 | J. Sasaki | Oct. 16, 1973 |

SUMMARY OF THE INVENTION

It is an object of the present invention to provide a water treatment which permits more efficient purification of polluted liquids than known treatment systems realize.

It is another object of the present invention to provide a complete effluent treatment plant capable of rendering an effluent suitable for use as a potable water.

It is still another object of the present invention to provide a treatment system which integrates biodegradation and sterilization into a single, cooperatively functioning stage.

It is yet another object of the present invention to provide an effluent treatment system that integrates sonic and electrodialysis biodegradation into a single unit.

These and other objects are achieved according to the present invention by providing a water treatment system having: a conduit connected to a supply of effluent; a self-celaning filter assembly connected to the conduit for receiving effluent from the conduit and filtering the effluent for removing solids from the effluent; an ozone and oxidation assembly connected to the filter assembly for receiving filtered effluent from the filter assembly; an ozonizing assembly connected to the ozone and oxidation assembly for changing the conditioning character of the filtered and oxidized effluent; and a sterilizing assembly connected to the ozonizing assembly for decontaminating the filtered, oxidized, and ozonized effluent.

The ozonizing assembly advantageously includes: a casing connected to the ozone and oxidation assembly for receiving effluent from the latter; an ultra-sonic sound generating system including a speaker arranged in the casing for breaking down particles in the effluent by subjecting the effluent to ultra-sonic wave; an air line connected to the casing and arranged for injecting air into the casing and aerating the liquid passing through the casing; and electrodes connected to a source of electrical energy and to the casing for passing an electrical current through the effluent in the casing as the effluent is being subjected to ultra-sonic waves for creating ozone in the presence of the air and effluent in the casing and decomposing the effluent.

The sterilizing assembly preferably includes: a laser beam interconnected to the casing of the ozonizing means for receiving effluent from the casing and irradiating same; and a germicidal unit connected to the laser beam unit and arranged for receiving irradiated effluent from the laser beam unit and killing germs and bacteria in the effluent that may have been left by the prior stages. The germicidal unit advantageously includes an elongated shell forming a chamber and provided with a plurality of longitudinal germicidal lamps arranged in parallel relationship within the shell.

A preferred filter assembly according to the present invention has a container for liquid being treated. A rotating filter is arranged in the container between an inlet and outlet of the latter, and a trough is arranged for receiving solids from the rotating filter. A settlement tank is arranged adjacent a discharge end of the trough for receiving solids from the latter. The filter advantageously includes a circular screen filter element having an outer periphery, or rim, and mounted for rotation about its central axis. A shaft is advantageously mounted for rotation on the container for permitting rotation of the filter element, while a baffle is arranged in the container for sealing relative to the container the portion of the periphery of the filter element which is submerged in the liquid in the container at any instant in time.

The ozone and oxidation assembly includes, in a preferred embodiment, a housing having an inlet and an outlet. A shaft is journaled on the housing and arranged extending through the latter between the inlet and outlet thereof, while a basket framework is provided on the shaft for rotation with same. Arranged over the basket framework is a screen which is enclosed in an end adjacent the outlet of the housing and extends toward the end adjacent the inlet to the housing for shrouding the inlet and causing liquid passing through the housing to pass through the screen. According to an advantageous feature of the ozone and oxidation assembly, the shaft rotates the screen, and is itself a hollow shaft provided with at least one aperture for permitting air, and the like, to be passed under pressure into the housing and aerate the liquid effluent passing through the oxidation assembly. In this manner, the effluent is partially ozonized due to any static charges that may be set up in the oxidation assembly, and is thoroughly agitated and oxidized prior to being passed into the ozonizing chamber where the effluent is decomposed. This thorough mixing of the effluent prior to being injected into the ozonizing assembly enhances the decomposition of the effluent.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic flow diagram showing a water treatment system according to the present invention.

FIG. 4 is a fragmentary, sectional view taken generally along the line 4—4 of FIG. 1.

FIG. 5 is a fragmentary, sectional view taken generally along the line 5—5 of FIG. 4.

FIG. 6 is a fragmentary, sectional view taken generally along the line 6—6 of FIG. 5.

DESCRIPTION OF THE PREFERRED EMBODIMENTS

Figure 1:
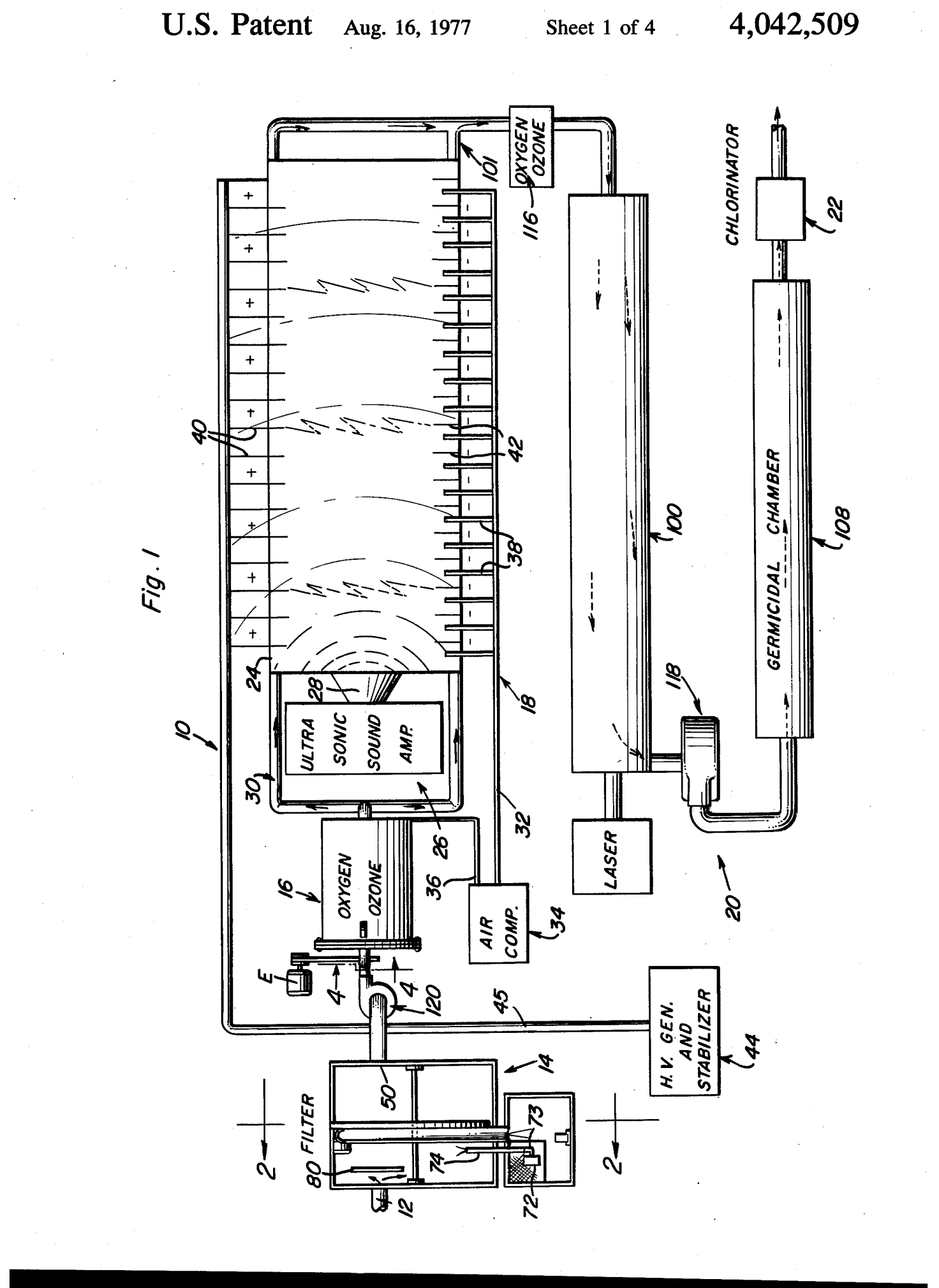
Figure 2:
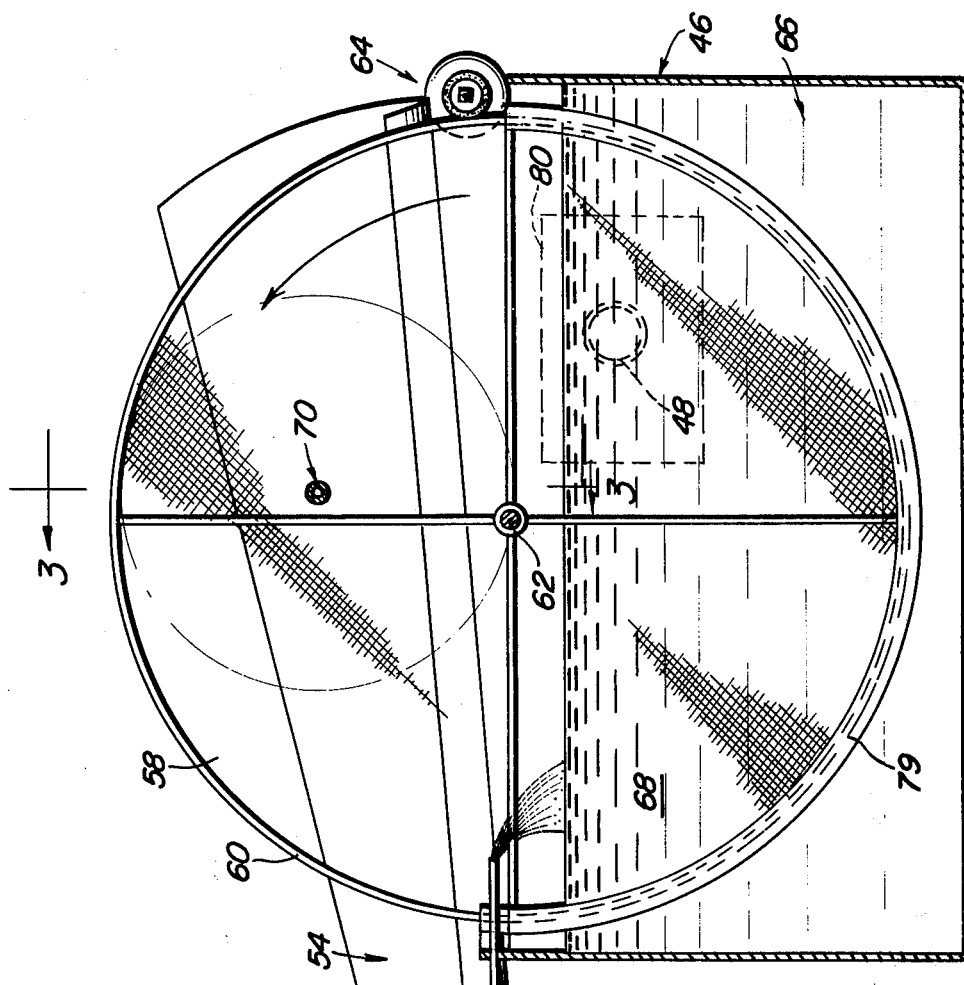
FIG. 2 is a partially schematic, sectional view taken generally along the line 2—2 of FIG. 1.

Referring now more particularly to the schematic flow diagram shown in FIG. 1 of the drawings, a water treatment system 10 according to the present invention has a conduit 12 which may be connected to a suitable supply of effluent (not shown) such as a sewer line. A self-cleaning filter assembly 14 is connected to conduit 12 for receiving effluent from conduit 12 and filtering the effluent for removing solids from the effluent. Once filtered, the effluent passes to an ozone and oxidation assembly 16 connected to filter assembly 14 for receiving the filtered effluent therefrom. Ozonizing assembly 18 connected to assembly 16 receives the filtered and oxidized effluent and changes the conditioning character of the effluent by decomposing same in a manner to be described in greater detail below. Finally, a sterilizing assembly 20 is connected to assembly 18 for decontaminating the filtered, oxidized, and ozonized effluent, while it may be desirable in some instances to provide a chlorinator unit 22 connected to sterilizing assembly 20 for chlorinating the decontaminated effluent prior to discharging the effluent from system 10.

Ozonizing assembly 18 advantageously includes a generally cylindrical casing 24 connected to the ozone and oxidation assembly 16. A generating system 26, which may be a conventional ultra-sonic sound amplifier, includes a, for example, underwater speaker 28, of conventional construction, attached to and communicating with the interior of casing 24. The latter can be attached to assembly 16 as by the illustrated branched line 30. Further, an air line 32 is arranged extending from a conventional air compressor 34 to extend parallel to the extent of casing 24. Compressor 34 is also attached to assembly 16 as by a line 36 for providing aerating fluid to the assembly in a manner to be described in greater detail below. Air line 32 is connected to casing 24 as by a plurality of substantially parallel nozzles 38 for aerating effluent passing through casing 24. Electrodes 40 and 42, with the former being illustrated as the positive electrodes, are connected to a source of electrical energy in the form of a generator and stabilizer 44 and to casing 24 for passing an alternating electrical current through the effluent in casing 24 and creating ozone in the presence of the air and effluent in the casing 24.

Generator and stabilizer 44 may be of any suitable, known kind of equipment capable of generating a stable alternating current through cable 45 and to the positive electrodes 40. It will be appreciated that the negative electrodes 42 may be grounded in a conventional manner (not shown). While the amount of current transmitted by generator and stabilizer 44 may vary as to the capacity of casing 24, and in view of other variable parameters, best results are generally obtained when a current density between substantially 1 and 100 milliamperes/cm.$^2$ is used with a frequency ranging between substantially 40 and 500 cycles/sec. Furthermore, optimum results are obtained for sewage decomposition at a current density of, for example, 10 ma./cm.$^2$ and at a frequency of about 50 to 60 cycles/sec. Alternating current at 50 cycles with an applied voltage of 18 volts and a current of 6 amp. has been found satisfactory when electrodes are immersed to a depth of about 1 m. into the effluent at a spacing of about 2 m. from one another. While the time of application of the current to the effluent within casing 24 may vary again according to the specific conditions, a sequence timed in a conventional manner so as to apply the alternating current for a period of 3 minutes with 12 minute interruptions has been found satisfactory in prior devices. Generating system 26 advantageously generates compression waves by means of speaker 28 at frequencies at least as high as 5000 cycles/sec. and at an intensity of at least 160 db. This will result in a sound pressure of 10$^4$ dynes per square centimeter, or better. It will be appreciated, however, that since casing 24 is intended to be capable of providing a constant flow of effluent through system 10, routine experimentation may be done by those skilled in the art to determine the optimum rate of flow and amount of electrical and sonic energy applied to the effluent in casing 24 in order to achieve the desired biodegradation of the effluent as same passes through casing 24.

Figure 3:
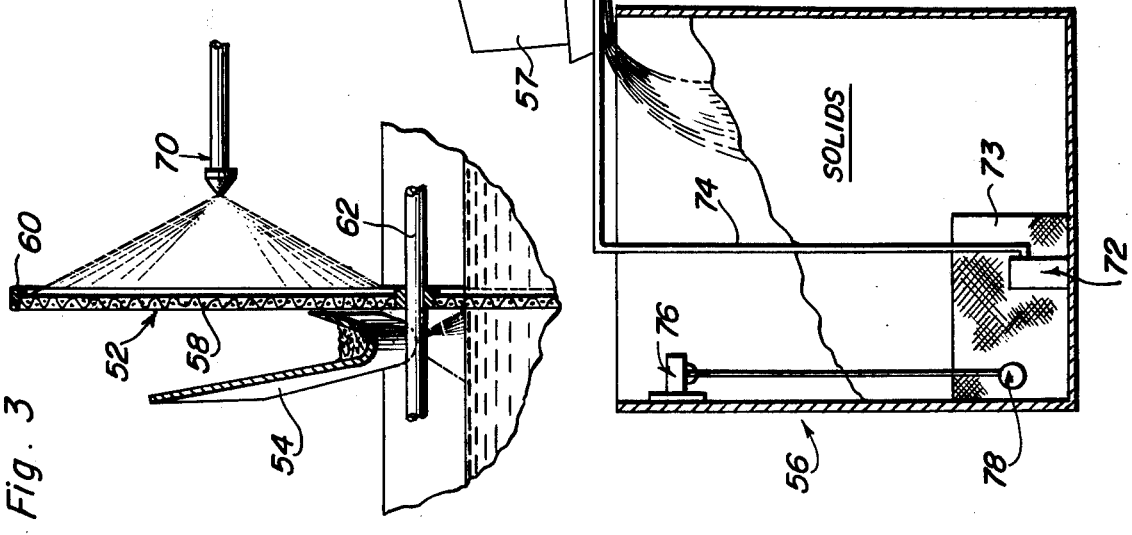
FIG. 3 is a fragmentary, sectional view taken generally along the line 3—3 of FIG. 2.

Referring now more particularly to FIGS. 2 and 3 of the drawings, filter assembly 14 advantageously includes a, for example, substantially rectangular container 46 open at the top and disposed for receiving liquid being treated from the input conduit 12. For this purpose, container 46 is provided with an inlet 48 and an outlet 50 arranged on opposite side walls of container 46. A rotating filter 52 is arranged in container 46 between inlet 48 and outlet 50 so as to extend transversely of container 46, while a trough 54 is arranged above container 46 for receiving solids from filter 52 and transferring these solids to a settlement tank 56 arranged adjacent a discharge end 57 of trough 54.

Filter 52 advantageouly includes a circular screen filter element 58 having an outer periphery in the form of a rim 60 and mounted for rotation about its central axis by means of a shaft 62 journaled on container 46 as by conventional bearings. A conventional friction drive assembly 64 is also mounted on container 46 in a suitable manner and is arranged contacting rim 60 of filter element 58 for rotating filter element 58 and, accordingly, shaft 62 so as to cause the portion of filter element 58 which is immersed in the effluent in container 46 at any instant to filter solids from the effluent as the effluent passes from the inlet 48 side of container 46 to the outlet 50 side of the container 46. To facilitate this filtering action, a baffle 66 provided with a generally semi-circular cutout portion is arranged within container 46 for cooperating with the periphery of filter element 58 which is submerged in the effluent 68 at any instant in time and prevent the effluent from passing by filter element 58 as opposed to through the latter. As will be appreciated, the solids in the incoming effluent will adhere to filter element 58—which filter element 58 is advantageously a, for example, stainless steel screen of suitable determined mesh—be carried by the rotation of filter element 58 to the area above container 46, removed from filter element 58 by action of gravity and the force of a stream of, for example, water emitted from a conventional nozzle 70 connected to a suitable source of water, and the like, under pressure, fall into trough 54 and transfer down trough 54 under the influence of gravity into settlement tank 56.

A sump pump 72 is advantageously arranged in the bottom of settlement tank 56, behind a screen 73 formed into a cage in a portion of the bottom of tank 56 for preventing solids from reaching the area of pump 72, pumps liquid settling out of solids accumulated in tank 56 back into container 46 as by a line 74. Further, a suitable, known switch 76 is connected to a float 78 arranged extending into the cage formed by screen 73 for actuating the conventional sump pump 72 whenever the liquid (not shown) within the confines of cage 73 reaches a predetermined level.

It will be appreciated that the cutout portion 79 of baffle 66 may be formed of a conventional soft rubber or plastic in order to providde the requisite seal with respect to rim 60 of filter element 58. Further, those components of the filter assembly 14 which are constructed from a metal are advantageously constructed from a non-corrosive metal such as stainless steel. Friction drive assembly 64 may also be provided with a rubber or soft plastic pulley connected to the shaft of a conventional electric motor, and the like, for frictionally engaging rim 60 of filter element 58 and causing rotation of filter 52. The filtered solids are to be removed from settlement tank 56 in any suitable manner, not shown. As an optional feature, nozzle 70 may be connected to a suitable pump (not shown) that pumps effluent from the filtered side of container 46. Finally, the flow of effluent into container 46 may be facilitated by arranging a baffle plate 80 spaced from, but directly opposite, the inlet 48 provided in a side wall of container 46. In this manner, proper distribution of the unfiltered effluent across the lower face of filter element 58 is assured.

Details of the ozonizing and oxidizing assembly 16 are shown in FIGS. 4 through 6 of the drawings, wherein there is illustrated a housing 81 provided with a pair of spaced intakes 82 and a pair of spaced discharge pipes 84 arranged opposite the intakes 82. A shaft 86 is arranged journaled in ends 88 and 90 of housing 81, which latter is advantageously completed by the illustrated cylindrical wall 91. A basket framework 92 is mounted on shaft 86 for rotation therewith, and a screen 94 is arranged over basket framework 92, and closed at an end thereof adjacent end 90 of housing 81, and is disposed shrouding intakes 82 for causing effluent passing through housing 81 to pass through screen 94. As will be appreciated, the mesh of screen 94 will be determined by, for example, the rate of flow through housing 81 as well as the size of any particles in the effluent which is desired to be filtered. Basically, however, the purpose of screen 94 is to cause turbulence in the flow of effluent through housing 81, while simultaneously setting up static charges that may cause ozonizing of the effluent. Toward this end, shaft 86 is provided as a hollow shaft having at least one, and advantageously the illustrated plurality of apertures 96 through which air from compressor 34 may be fed under pressure for aerating the effluent. Further, it will be appreciated that line 36 is connected to shaft 86 as by a conventional manifold 97. As perhaps can best be seen from FIGS. 4 and 5 of the drawings, shaft 86 is rotated by a conventional belt 98 cooperating with a pulley affixed to shaft 86 and connected to a suitable electric motor E (FIG. 1) and the like, while a pressure gauge 99, of conventional construction, may be provided on housing 81, perhaps in wall 91 as illustrated, for monitoring the pressure within housing 81. As will be appreciated, the various metal elements forming assembly 16 should be constructed from a non-corrosive material, such as stainless steel. Further, air supply line 36 is advantageously connected to agitator shaft 86 by a manifold 97 in the form of a conventional high compression swivel fitting (not shown in detail). As will also be appreciated, the faster the basket formed by framework 92 and screen 94 rotates, the more ozone will be created within assembly 16 by electric friction in the effluent. In addition, the agitation of the effluent simultaneously with the aeration thereof will cause beneficial oxidation of the effluent prior to submission of same to the ozonizing assembly 18.

Figure 9:
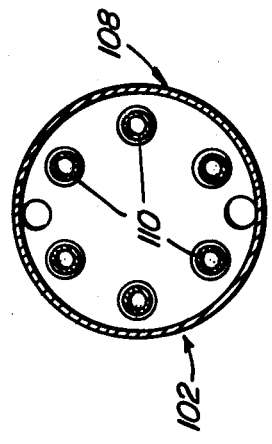
FIG. 9 is a sectional view taken generally along the line 9—9 of FIG. 7.
Figure 8:
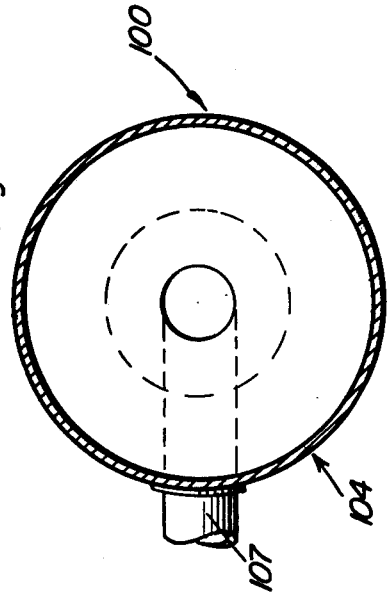
FIG. 8 is a fragmentary, sectional view taken generally along the line 8—8 of FIG. 7.
Figure 7:
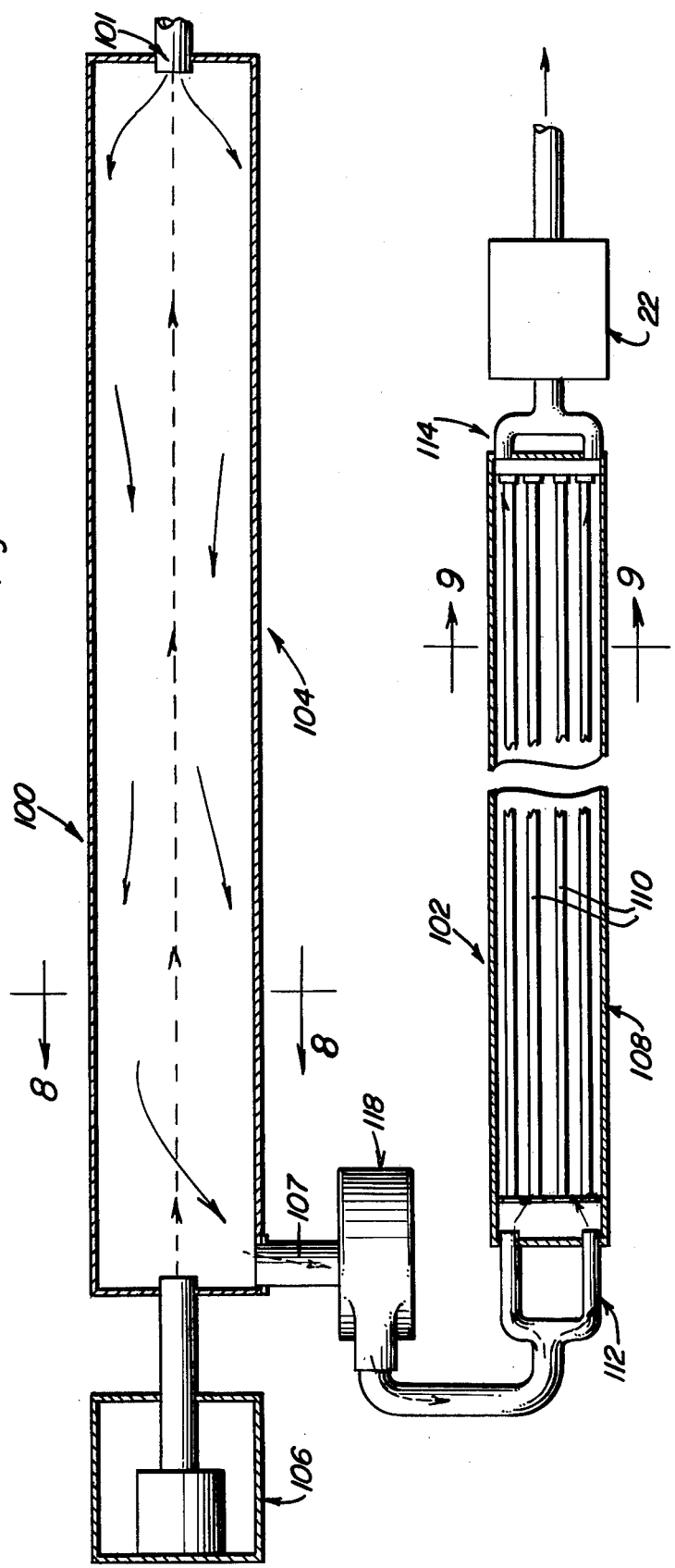
FIG. 7 is a fragmentary, horizontal sectional view showing in detail a sterilizing unit according to the present invention.

FIGS. 7 through 9 show a preferred embodiment of a sterilizing assembly 20 according to the present invention. This assembly 20 includes a laser beam unit 100 connected to the branched outlets 101 connected to outlet openings of casing 24 of assembly 18 for receiving decomposed effluent from casing 24 and irradiating same. Assembly 20 also includes a germicidal unit 102 connected to unit 100 and arranged for receiving irradiated effluent from unit 100 and killing germs and bacteria that may have been left in the effluent by the prior stages of system 10.

Laser beam unit 100 is of a somewhat conventional nature in that it includes a longitudinally extending cylinder 104 having enclosed ends with the exception of the inlet end of branch connection 101 and the emitter end of a conventional laser gun 106. Further, the cylindrical wall of cylinder 104 has provided therein a fitting 107 which connects unit 100 to unit 102 in an optional manner to be described below. As can be readily appreciated from FIG. 7, the construction of unit 100 causes a counterflow of the effluent with respect to the laser radiation, thus providing maximum contact between the effluent and the radiation.

Germicidal unit 102 advantageously is constructed as an elongated shell 108 forming a chamber in which are disposed a plurality of longitudinally extending germicidal lamps 110 arranged in parallel relationship with respect to one another and with respect to shell 108. The latter has advantageously a pair, or branched inlets 112 and a pair, or branched, outlets 114 connected to unit 100 and chlorinator 22, respectively. The latter may be of conventional construction, and accordingly the details of construction of chlorinator 22 will not be set forth herein. Lamps 110, which are electrically connected within shell 108 in a conventional manner not shown and are energized by a conventional source of electricity also not shown, may be of a conventional nature. For example, lamps manufactured by the General Electric Company with the designation "G30T8" have been found satisfactory for use within unit 102.

It will be appreciated that germicidal unit 102 is basically a polishing unit, and sterilizing assembly 20 could consist only of a single unit such as laser beam unit 100 if so desired.

A further ozone and oxidation assembly 116, which may be identical to assembly 16, is advantageously arranged between ozonizing assembly 18 and laser beam unit 100 for additionally decomposing and agitating the effluent prior to the passage of the effluent through laser beam unit 100. In particular, it has been found desirable to agitate effluent prior to passing same through a laser beam unit. In addition, a still further ozone and oxidation assembly 118 is desirably arranged between laser beam unit 100 and germicidal unit 102, as is shown in FIGS. 1 and 7 of the drawings. This unit 118 functions in a manner similar to unit 116, and merely enhances the efficiency of system 10.

The operation of a water treatment system 10 according to the present invention will now be described.

An effluent is passed into container 46 by conduit 12 and solids are filtered from the effluent by the action of filter 52. The filtered effluent is then passed through outlet 50 and, advantageously, a blower 120, which may be a conventional water pump selected to fit the desired flow to be delivered, and fed into ozonizing and oxidating assembly 16. Here the effluent is agitated, oxidized, and preliminarily decomposed by some ozonizing. Subsequent to treatment in assembly 16, the effluent is fed into assembly 18 and decomposed by the influence of ultra-sonic waves to which the effluent is subjected. Simultaneously with subjection of the effluent to ultra-waves, the effluent is aerated by means of air ejected through nozzles 38 and into casing 24, while a suitable electrical current, as discussed above, is passed through the effluent as same is being subjected to the ultra-sonic waves and the aeration. As will be appreciated, decomposition of the biodegradable material forming the effluent will take place both by the subjection of the effluent to ultra-sonic waves and by electrodialysis. Thus, the decomposition is necessarily complete since all possible actions which normally contribute to decomposition of biodegradable sustances is taking place within casing 24.

Once the effluent has been adequately decomposed, the effluent is passed to assembly 20 for sterilization, and chlorinator 22 for chlorination, if desired.

As will be readily appreciated, the frequency of the ultra-sonic waves generated in casing 24, as well as the specific electrical current passed through casing 24, will be largely determined by the size of casing 24 and the flow of the effluent through the system 10. Accordingly, while the parameters set out above for the frequency of the ultra-sonic waves and for the electric current passing between electrodes 40,42 is intended to provide one skilled in the art with a guide as to optimum values that have been previously employed for sonic wave agitating devices and electrodialysis devices, it is to be understood that the aforementioned values do not necessarily reflect option values for a given system. Further, the flow ratio of the effluent will vary as a function of dimension employed for the various assemblies.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A water treatment system, comprising, in combination:
  a. a conduit connected to a supply of effluent;
  b. a self-cleaning filter assembly connected to the conduit for receiving effluent from the conduit and filtering the effluent for removing solids from the effluent;
  c. an ozone and oxidation assembly connected to the filter assembly for receiving filtered effluent from the filter assembly;
  d. ozonizing means connected to the ozone and oxidation assembly for changing the condition and character of the filtered and oxidized effluent; and
  e. sterilizing means connected to the ozonizing means for decontaminating the filtered, oxidized, and ozonized effluent; and the ozonizing means includes: a casing connected to the ozone and oxidation assembly for receiving effluent from the ozone and oxidation assembly; an ultra-sonic sound generating system including a speaker arranged in the casing for breaking down particles in the effluent by subjecting the effluent to ultra-sonic waves; an air line connected to the casing and arranged for injecting air into the casing and aerating the effluent passing through the casing; and electrodes connected to a source of electrical energy and to the casing for passing an electrical current through the effluent in the casing and creating ozone in the presence of the air and effluent in the casing.

2. A structure as defined in claim 1, wherein the sterilizing means includes, in combination: a laser beam unit connected to the casing of the ozonizing means for receiving effluent from the casing and irradiating same; and a germicidal unit connected to the laser beam unit and arranged for receiving irradiated effluent from the laser beam unit and killing germs and bacteria that may have been left in the effluent by the prior stages of the system.

3. A structure as defined in claim 2, wherein the germicidal unit includes an elongated shell forming a chamber and having a plurality of longitudinally extending germicidal lamps arranged in parallel relationship within the shell, the shell having a pair of inlets and a pair of outlets.

4. A structure as defined in claim 3, wherein a further ozone and oxidation assembly is arranged between the casing and the laser beam unit, and a still further ozone and oxidation assembly is arranged between the laser beam unit and the germicidal unit.

5. A structure as defined in claim 4, wherein the filter assembly includes a container for liquid being treated and provided with an inlet and an outlet, a rotating filter arranged in the container between the inlet and outlet, a trough arranged for receiving solids from the filter, and a settlement tank arranged adjacent a discharge end of the trough for receiving solids from the trough.

6. A structure as defined in claim 5, wherein the filter includes a circular screen filter element having an outer periphery and mounted for rotation about a central axis of the circular screen filter element, a shaft rotatably mounted on the container and supporting the filter element for rotation with the shaft, drive means contacting the outer periphery of the filter element for rotating the filter element, and a baffle arranged in the container for sealing relative to the container the portion of the periphery of the filter element which is submerged in the effluent in the container at a given instant in time.

7. A structure as defined in claim 6, wherein the ozone and oxidation assembly includes a housing having an intake and a discharge, an axle journaled on the housing and arrangement extending through the housing between the intake and the discharge, a basket framework mounted on the axle for rotation therewith, and a screen arranged over the basket framework for forming an enclosure, the screen closed at an end adjacent the discharge and arranged extending to the housing adjacent the intake for shrouding the intake and causing the effluent passing through the housing to pass through the screen, the axle being hollow, provided with at least one aperture, and connected to a source of air under pressure for aerating the effluent passing through the housing, the aeration and agitation of the effluent passing through the housing causing the effluent to be oxidized.

8. A water treatment system, comprising, in combination:
   a. a conduit connected to a supply of effluent;
   b. a self-cleaning filter assembly connected to the conduit for receiving effluent from the conduit and filtering the effluent for removing solids from the effluent;
   c. an ozone and oxidation assembly connected to the filter assembly for receiving filtered effluent from the filter assembly;
   d. ozonizing means connected to the ozone and oxidation assembly for changing the condition and character of the filtered and oxidized effluent;
   e. sterilizing means connected to the ozonizing means for decontaminating the filtered, oxidized, and ozonized effluent; and the sterilizing means includes: a laser beam unit connected to the casing of the ozonizing means for receiving effluent from the casing and irradiating same; and a germicidal unit connected to the laser beam unit and arranged for receiving irradiated effluent from the laser beam unit and killing germs and bacteria that may have been left in the effluent by the prior stages of the system.

9. A structure as defined in claim 8, wherein the germicidal unit includes an elongated shell forming a chamber and having a plurality of longitudinally extending germicidal lamps arranged in parallel relationship within the shell, the shell having a pair of inlets and a pair of outlets.

10. A water treatment system, comprising, in combination:
   a. a conduit connected to a supply of effluent;
   b. an open self-cleaning disc filter assembly connected to the conduit for receiving effluent from the conduit and filtering the effluent for removing solids from the effluent;
   c. an ozone and oxidation assembly connected to the filter assembly for receiving filtered effluent from the filter assembly;
   d. ozonizing means connected to the ozone and oxidation assembly for changing the condition and character of the filtered and oxidized effluent; and
   e. sterilizing means connected to the ozonizing means for decontaminating the filtered, oxidized, and ozonized effluent, the ozone and oxidation assembly including a housing having an intake and a discharge, an axle journaled on the housing and arranged extending through the housing between the intake and the discharge, a basket framework mounted on the axle for rotation therewith, and a screen arranged over the basket framework for forming an enclosure, the screen closed at an end adjacent the discharge and arranged extending to the housing adjacent the intake for shrouding the intake and causing the effluent passing through the housing to pass through the screen, the axle being hollow, provided with at least one aperture, and connected to a source of air under pressure for aerating the effluent passing through the housing, the aeration and agitation of the effluent passing through the housing causing the effluent to be oxidized.

11. A structure as defined in claim 10, wherein the filter assembly includes a container for liquid being treated and provided with an inlet and an outlet, a rotating filter disc arranged in the container between the inlet and outlet, a trough arranged for receiving solids from the filter, and a settlement tank arranged adjacent a discharge end of the trough for receiving solids from the trough.

12. A structure as defined in claim 11, wherein the filter disc includes a circular screen filter element having an outer periphery and mounted for rotation about a central axis of the circular disc screen filter element, a shaft rotatably mounted on the container and supporting the filter element for rotation with the shaft, drive means contacting the outer periphery of the filter element for rotating the filer element, and a baffle arranged in the container for sealing relative to the container the portion of the periphery of the filter element which is submerged in the effluent in the container at a given instant in time.

13. A structure as defined in claim 10, wherein the system further includes a chlorinator means connected to the sterilization means for chlorinating the decontaminated effluent.

* * * * *